United States Patent [19]

Fisher

[11] 4,175,039
[45] Nov. 20, 1979

[54] WASHER/SEPARATOR SYSTEM FOR DRILLING CUTTINGS IN WATER ENVIRONMENT OIL WELLS

[76] Inventor: Johnny D. Fisher, 118 Clause La., Lafayette, La. 70507

[21] Appl. No.: 873,377

[22] Filed: Jan. 30, 1978

[51] Int. Cl.² .............................................. B01D 21/02
[52] U.S. Cl. .......................................... 210/74; 175/5; 175/66; 210/83; 134/10; 134/25 R
[58] Field of Search ................... 210/74, 83, 114, 523, 210/532 R, 194; 175/5, 66; 134/10, 25 R

[56] References Cited

U.S. PATENT DOCUMENTS

| 2,756,965 | 7/1956 | Howe | 210/523 X |
| 2,861,688 | 11/1958 | Harms | 210/83 X |
| 3,392,114 | 7/1968 | Delcellier | 210/73 R X |

FOREIGN PATENT DOCUMENTS 45-19230  1/1970  Japan ...................................... 210/523

*Primary Examiner*—William A. Cuchlinski, Jr.
*Attorney, Agent, or Firm*—C. Emmett Pugh & Associates

[57] ABSTRACT

A washer separator system for drilling cuttings for use in drilling mud washing systems for water environment oil wells filled with washing solution is described using a receiving tank with an agitation subchamber which causes thorough scrubbing of the deposited drilling cuttings. The washed cuttings settle to the bottom of the tank causing the solution level to rise. When a predetermined solution level is reached, an auger, situated at the bottom of the tank, is activated and the collected cuttings are removed. When the solution level drops a sufficient amount for removal of the cuttings, the auger is shut off and the cycle begins anew. Fresh water washing solutions may be used, so that the oil saturated depleted solution may be added to the drilling mud. Collected cuttings may be deposited in the water environment without a slick forming. A pump delivers solution to the top of the cuttings trough. Intake for the pump is above the collected cuttings.

4 Claims, 4 Drawing Figures

WASHER/SEPARATOR SYSTEM FOR DRILLING CUTTINGS IN WATER ENVIRONMENT OIL WELLS

BACKGROUND OF THE INVENTION

1. Field of the Invention

The present invention relates to systems for washing the cuttings which are separated from water environment oil well drilling mud, and more particularly relates to a system for washing such cuttings and separating them from the mud residue, including oil, so that the cuttings may be disposed of in the surrounding water without oil pollution thereof.

2. General Background and Prior Art

In off-shore drilling, an emulsion, or "mud", is continuously pumped down the hole through the drilling joints so that the drilling cuttings may be washed away with the mud as it circulates back to the surface through the annulus surrounding the drilling line. So that the mud may be re-used, it is necessary to remove the cuttings it has picked up. Cutting separators, known in the art as "shale shakers", perform this separation function by means of a vibrating screen which "catches" the cuttings while allowing the mud to drip through where it is collected for re-use. The accumulated cuttings are then deposited in a wash trough which carries the cuttings, much as a flume carries logs, to a washer/separator some distance from the shale separators.

In the prior art washing is performed using a receiving tank, filled with washing solution. The cuttings are dropped from the trough into the tank where they are washed. The accumulated cuttings at the bottom are pumped out through an opening located at the bottom of the tank to another shale separator or shaker located immediately above the tank. The washing solution drips through the screen while the now clean cuttings are deposited into the surrounding water. Part of the pumped cuttings filled solution is diverted to the top of the wash trough to carry the cuttings deposited there down the trough as described above.

This system has several disadvantages. First these washer/separators are by design necessity, at least 10 feet tall. Since drilling rigs generally have an inter-tier spacing of only 8 feet, a separate platform section must be constructed to accomodate it. Second, the cuttings tend to collect at the opening of the pump and clog it. The cuttings also stick to the pump blades and clog the pump itself, as well as causing damage to the pump. Damage of this kind occurs regularly and the entire separation system must be shut down on a regular basis to clean the pump and tank. Third, the shale separator screens wear out regularly and must be replaced, with accompanying additional shut down time. Fourth, sea water washing solutions must be used to prevent the shale, composed usually of Montmorillonite clay, from breaking up and causing even more frequent and severe clogging of the pump system. Fifth, separator screens do not effectively remove all of the sand, some of which remains in suspension in the washing solution and causes abrasion of the pump mechanism. This results in even more frequent maintenance shut-downs.

The present invention solves all of these problems.

3. General Discussion of the Invention

The present invention includes a receiving tank for the cuttings deposited from the wash trough. The cuttings fall through an agitation subchamber which insures thorough washing of the cuttings, while keeping solution agitation confined to the subchamber. The washed cuttings fall by the action of gravity through the bottom of the subchamber to the bottom of the tank. The bottom of the tank is sloped toward the center where a trough like subextension of the tank houses a horizontally placed auger. As cuttings fill the tank, the solution level rises due to displacement. When the level has risen a predetermined amount, a level activated switch turns on a motor which drives the auger and at substantially the same time opens a drain valve at the outlet end of the auger. The auger pushes the cuttings through the valve where they may be deposited in the surrounding water. When the solution level then drops to a pre-determined level, another level activated switch closes the valve and stops the auger, again at substantially the same time.

The intake for the return wash solution which washes the cuttings down the wash trough is placed substantially above the settled cuttings and away from the agitation subchamber yet below the lowest level of the wash solution. The return wash solution thus remains highly ree of cutting debris. The advantages of the invention are as follows:

First: The device may be less than 8 feet tall, and in the preferred embodiment is, in fact, 7 feet tall, thus eliminating the need for drilling rig modification.

Second: Shut down due to pump clogging is virtually eliminated, since the return wash solution is highly free of cutting debris.

Third: Since the device does not use a "shale shaker" screen replacement and accompanying shut down is eliminated.

Fourth: Fresh water washing solution may be used because shale cutting break up does not affect the operation of the system.

Fifth: Since gravity, rather than screens, are used to cause separation, much finer filtration is effected and less abrasive sand remains in solution. Pump life is greatly extended.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 3 is a top view of the embodiment of FIG. 2 with a portion cut away to show the interior auger and with other interior elements shown in phantom line; while

DETAILED DESCRIPTION OF THE PREFERRED EMBODIMENT

Figure 1:
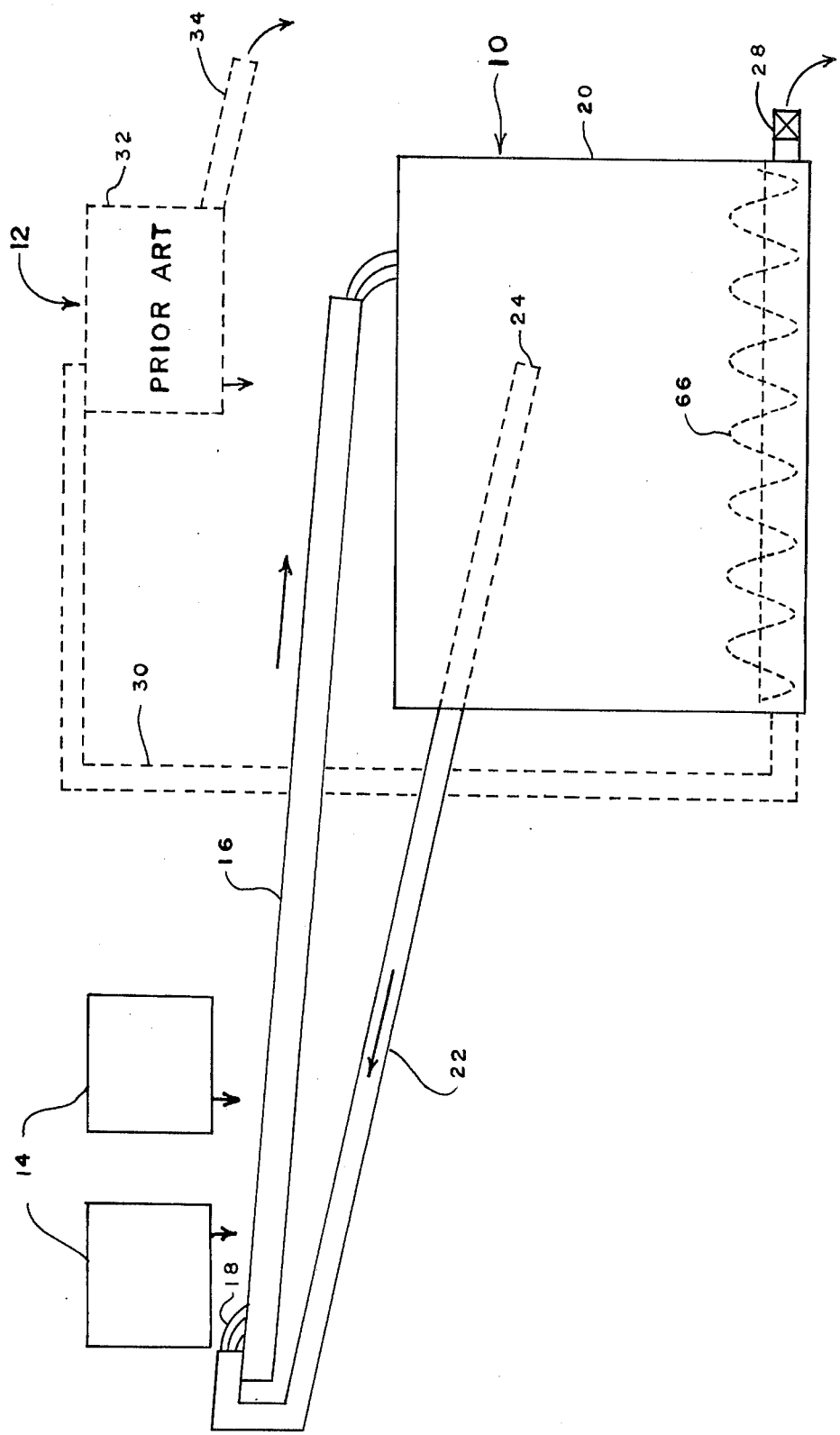
FIG. 1 is a schematic view of the over-all system using the preferred embodiment of the present invention with the prior art approach generally illustrated in phantom line.
Figure 2:
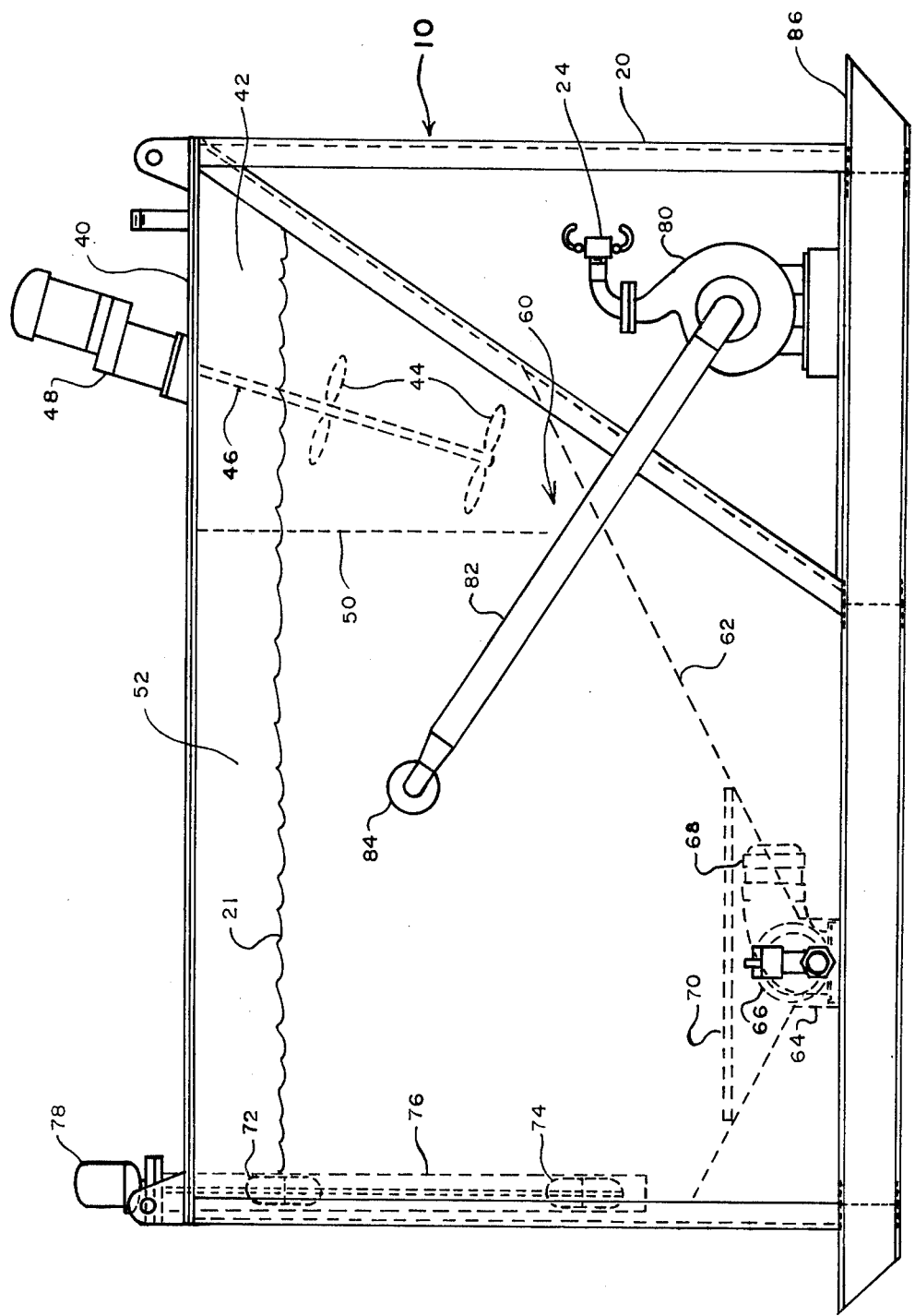
FIG. 2 is a front view of a preferred embodiment of the tank structure of the present invention, with interior elements indicated in phantom line.
Figure 3:
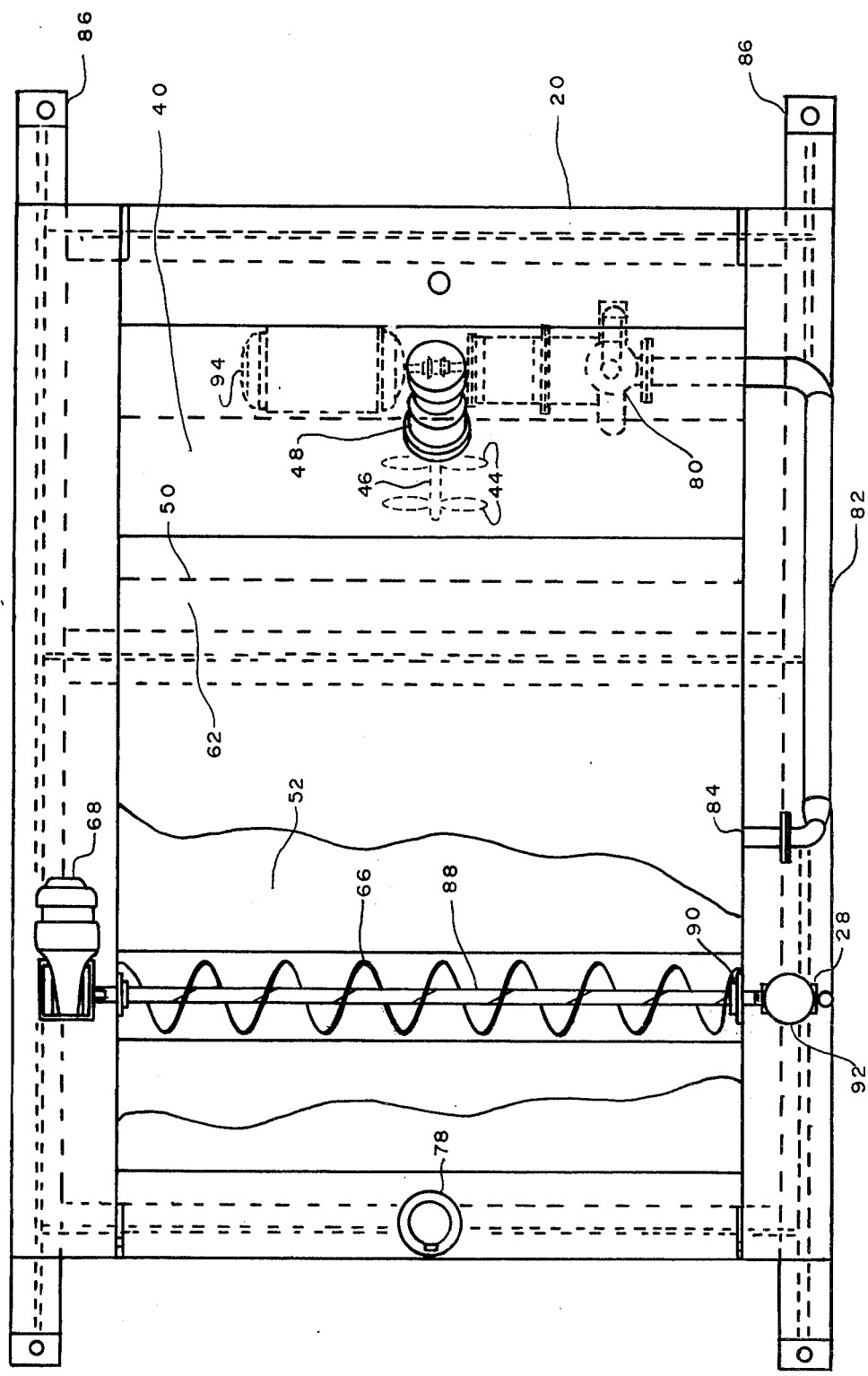
Figure 4:
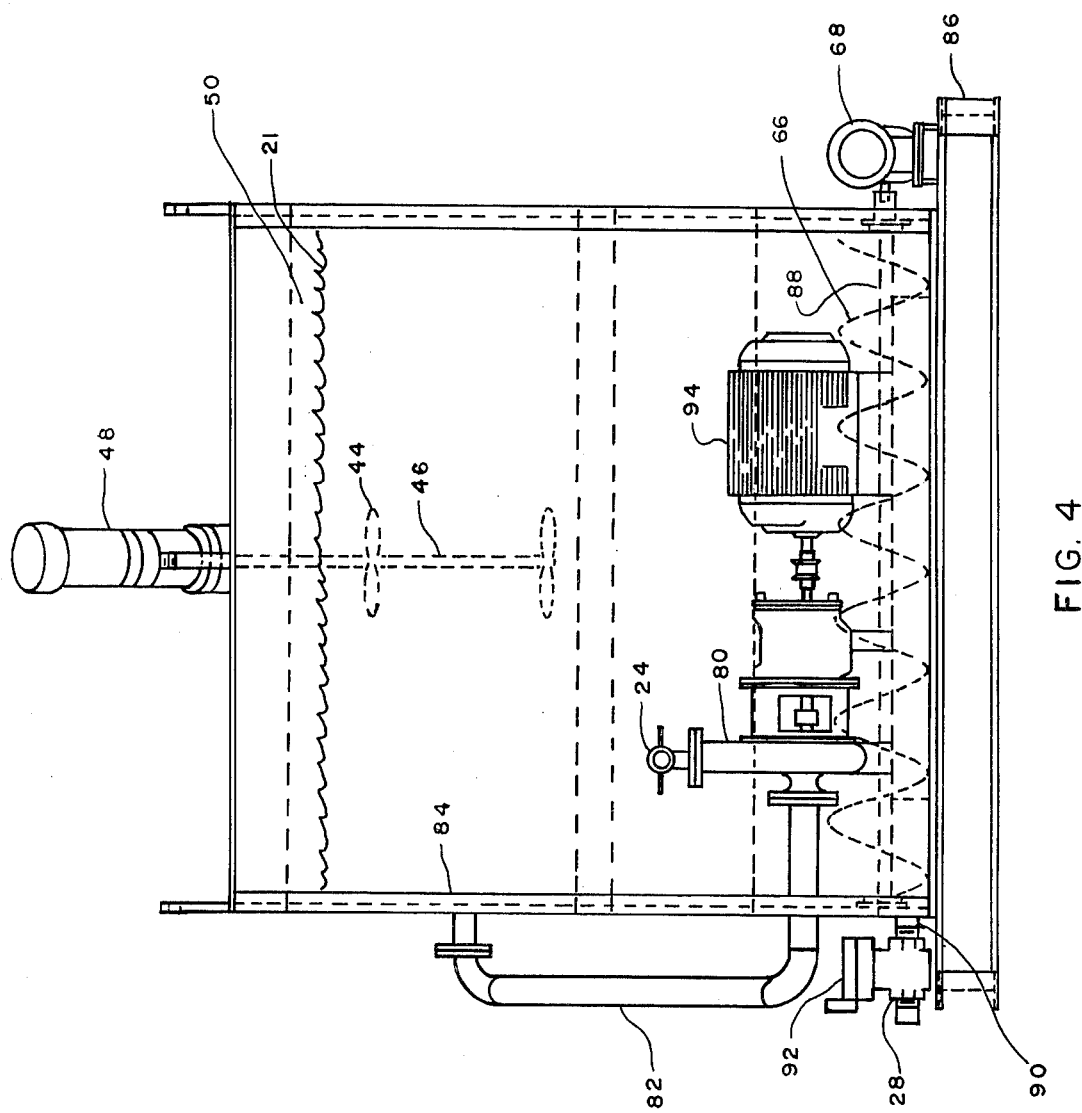
FIG. 4 is a side view of the embodiment of FIG. 2 with interior elements shown in phantom line.

In FIG. 1 there ca be seen a schematic view of a typical shale separator/washer system showing the proper placement of the preferred embodiment of the present invention which in turn is illustrated in FIGS. 2-4. A phantom line drawing of a prior art device 12 is shown superimposed in FIG. 1 for comparison purposes.

Shale separators or shakers 14 deposit cuttings which still include environmental pollutants such as oil and other drilling mud components into the conveying trough 16 in which they are transported in a stream of return wash fluid to the receiving tank structure 20. Return wash 18 is provided by return wash pipe 22 which extends from the return wash exhaust port 24 to the top of the wash trough 16. The auger, which serves as an extended mechanical screw driving means, pushes the collected cuttings out through the cutting discharge valve 28.

In the prior art device 12, the cuttings with wash solution are pumped from the bottom of a receiving tank (similar in function to the receiving tank 20 of the preferred embodiment) through separator pipe 30 to an additional shale separator or shaker 32 located above its analgous receiving tank. Washed cuttings are deposited through separator output port 34 and the solution flows down into the receiving tank.

In FIG. 2 there can be seen a front view of the preferred embodiment 10 of the present invention. The main body of the device 10 is the receiving tank structure 20, filled with washing solution 21. Cuttings to be washed drop through cutting intake port 40 into the agitation subchamber which forms an initial portion of the tank 20. Agitation to enhance washing is provided by agitation blades 44 connected to a shaft 46 driven by an agitation motor 48. A weir 50 separates the agitation subchamber 42 from the rest of the receiving tank 52. Cuttings drop down through a gap 60 between the weir 50 and the bottom of the tank 62, and collect in the auger trough 64, which forms a cuttings outlet feed section at the bottom of the tank.

The auger 66 is driven by auger drive motor 68. The auger 66 is protected from large objects by a grill 70 placed over it. The upper and lower level trip switches 72, 74 are mounted in a liquid level control unit 76 on a side of the tank 52. These switches are connected to auger discharge valve switching and sequencing unit 78. This unit turns the auger drive motor 68 "on" and "off" and opens and closes the cutting discharge valve 28 at the proper times and in the proper sequence as detected by the level trip switches 72, 74.

Return wash solution is drawn into the return wash pump 80 through return wash collecting pipe 82 which has its intake port 84 placed above the auger, as shown. The return wash is pumped out through return wash exhaust port 24.

The tank is sized and the minimum fluid level for tripping the "on" switch for the auger 66 is selected so that the auger 66 is generally not activated until the auger chamber trough 64 is filled with washed cuttings. Thus in the present invention, when cuttings are discharged, they are discharged with a minimum amount of fluids. This desired result is further enhanced by the presence of the auger trough 64 in reasonably close conformity to the shape of the auger 66.

The entire receiving tank structure 20 is placed on a skid 86.

While a particular embodiment of the invention has been described and illustrated in detail, it should, of course be understood that the present invention is not to be limited thereto, since many modifications therein may be made. Indeed various modifications have been made by the inventor himself in commercial embodiments of the invention, including for example, using hydraulic motors and drives in place of the electric motors and pneumatic controlled valves in place of the electrically controlled valves.

The present invention includes all modifications as fall within the true spirit and scope of the invention.

What is claimed as invention is:

1. The method of disposing of cuttings intermingled with fluids, such as oil, which are considered pollutants in water, from a well being drilled in a water environment comprising the following steps:
    (a) providing a washer/separator system at the drilling site which includes
        a washer/separator receiving tank having an initial portion into which the cuttings with mud and/or other fluid coatings thereon and water are dumped;
        a cuttings outlet feed secion located at the bottom of said tank;
        guiding means for directing and guiding the cuttings into said outlet feed section;
        a cutting outlet opening in said tank adjacent said outlet feed section;
        extended mechanical screw driving means for moving the cuttings from said feed section to and through said outlet openings for dumping out the cuttings;
        fluid outlet means located substantially above said cuttings outlet feed section and away from said initial portion of said tank for removing the fluids from said tank;
        agitation means located in said initial portion of said tank where the coated cuttings and fluids are initially introduced into the tank for enhancing the washing of the cuttings; and
        control means for turning said screw driving means "on" and "off";
    (b) providing an initial supply of treating fluid into said tank;
    (c) dumping the cuttings intermingled with fluids into said initial portion and agitating them with the treating fluids;
    (d) allowing the cuttings to be washed by the agitation and treating fluids to fall down into said feed section at the bottom of the tank;
    (e) allowing the polluting fluids to rise and collect in the fluid containing interior area;
    (f) intermittently and cyclically turning on said screw driving means when said feed section is filled with washed cuttings to drive the washed cuttings out of the tank;
    (g) disposing of the washed cutting by dumping the washed cuttings into the water environment; and
    (h) intermittently and cyclically turning off said screw driving means upon the fluid level in said tank reaching a pre-selected minimum level; whereby the cuttings are regularly disposed of into the water environment without pollution problems.

2. The method of claim 1 wherein step "g" is performed by the step of directly dumping the washed cuttings into the water environment immediately as they exit from said tank without further processing.

3. The method of claim 1 wherein there is further included the step of
    continuously circulating the fluid from said fluid containing interior area around to said inlet portion and using the circulated fluid to at least help drive the cuttings to be washed into said tank.

4. The method of claim 1 wherein the well being drilled is located offshore and the water environment is an offshore environment; and wherein there is included the step of drilling the well in the offshore environment from an off-shore drilling rig; and in step "a" there is included the step of locating and positioning said washer/separator tank between an inter-tier of the drilling rig.

* * * * *